United States Patent [19]

Hershey et al.

[11] Patent Number: 5,239,584
[45] Date of Patent: Aug. 24, 1993

[54] METHOD AND APPARATUS FOR ENCRYPTION/AUTHENTICATION OF DATA IN ENERGY METERING APPLICATIONS

[75] Inventors: John E. Hershey, Ballston, N.Y.; Larry A. Schmidt, Rochester; Marjorie J. Mancuso, Exeter, both of N.H.

[73] Assignee: General Electric Corporation, Schenectady, N.Y.

[21] Appl. No.: 813,637

[22] Filed: Dec. 26, 1991

[51] Int. Cl.5 .......................... H04L 9/28; H04L 9/32
[52] U.S. Cl. ........................................ 380/28; 380/23; 380/42; 380/50
[58] Field of Search ............... 380/50, 28, 49, 42, 380/28, 23, 25, 4

[56] References Cited

U.S. PATENT DOCUMENTS

| | | |
|---|---|---|
| 3,702,460 | 11/1972 | Blose . |
| 4,159,468 | 6/1979 | Barnes et al. ............ 380/50 X |
| 4,190,800 | 2/1980 | Kelly, Jr. . |
| 4,200,770 | 4/1980 | Hellman et al. ............ 380/30 |
| 4,349,695 | 9/1982 | Morgan et al. ............ 380/49 X |
| 4,405,829 | 9/1983 | Rivest et al. ............ 380/30 |
| 4,424,414 | 1/1984 | Hellman et al. ............ 380/30 |
| 4,749,992 | 6/1988 | Fitzemeyer . |
| 4,776,011 | 10/1988 | Busby ............ 380/28 X |
| 4,982,429 | 1/1991 | Takaragi et al. ............ 380/28 |
| 5,022,080 | 6/1991 | Durst et al. ............ 380/23 |

OTHER PUBLICATIONS

Engineering presentation to AEIC/EEI Meter and Services Committees, GE Meter and Control, Apr. 8, 1991 (pp. 1-14).
Engineering presentation to AEIC/EEI Meter and Services Committees, GE Meter And Control, Sep. 9, 1991 (pp. 1-5).
UCNet System Brochure, GE Meter and Control, Sep. 1991.
Encryption and Authentication for CEBus Common Application Language, Hershey et al., Presented at EIA meeting Jul. 29-31, 1991 (including DOD letter).
Data transportation and Protection, Hershey et al., Plenum Press (1986).

*Primary Examiner*—Gilberto Barrón, Jr.
*Attorney, Agent, or Firm*—Bell, Seltzer, Park & Gibson

[57] ABSTRACT

In one embodiment, the present invention is an encryption/decryption and authentication algorithm. The algorithm has three major steps. The first step is generating cipher text. The second step is generating the authentication field. The third step is encrypting or deciphering the appropriate data in the message. One byte of cipher text is generated for every byte of plain text contained in the message. After all the cipher text is generated, a four byte authentication field is generated using the last four bytes of cipher text. The message is then scanned for data fields which have been encrypted or are to be encrypted and the corresponding byte of cipher text replaces the message bytes. The encryption is accomplished by sending the cipher text instead of message text. To decipher the message, the algorithm operates in a reverse mode to replace the cipher text with the message text, i.e., the algorithm is a self-reversing process.

40 Claims, 3 Drawing Sheets

FIG. 1

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 96 | 96 | 96 | 76 | 96 | 96 | 96 | 76 | 96 | 86 | 94 | 64 | 17 | 07 | 15 | E5 |
| 1 | 96 | 9F | 96 | 7F | 90 | 99 | 90 | 79 | D6 | CF | D4 | 2D | 51 | 48 | 53 | AA |
| 2 | 96 | 96 | 96 | 76 | B6 | B6 | B6 | 56 | 9A | 8A | 98 | 68 | 3B | 2B | 39 | C9 |
| 3 | 06 | 0F | 06 | EF | 20 | 29 | 20 | C9 | 4A | 53 | 48 | B1 | ED | F4 | EF | 16 |
| 4 | 96 | 92 | 9E | 7A | C6 | C2 | CE | 2A | B6 | A2 | BC | 48 | 67 | 73 | 6D | 99 |
| 5 | 96 | 9B | 9E | 73 | C0 | CD | C8 | 25 | F6 | EB | FC | 01 | 21 | 3C | 2B | D6 |
| 6 | 95 | 91 | 9D | 79 | E5 | E1 | ED | 09 | B9 | AD | B3 | 47 | 48 | 5C | 42 | B6 |
| 7 | 05 | 08 | 0D | ED | 73 | 7E | 7B | 96 | 69 | 74 | 63 | 9E | 9E | 83 | 94 | 69 |
| 8 | 96 | 94 | 83 | 61 | 9E | 9C | 8B | 69 | 96 | 84 | 81 | 73 | 1F | 0D | 08 | FA |
| 9 | E6 | BD | A3 | 48 | B8 | B3 | AD | 46 | F6 | ED | E1 | 1A | 79 | 62 | 6E | 95 |
| A | D6 | D4 | C3 | 21 | FE | FC | EB | 09 | DA | C8 | CD | 3F | 73 | 61 | 64 | 96 |
| B | 66 | 6D | 73 | 98 | 48 | 43 | 5D | B6 | 2A | 31 | 3D | C6 | 85 | 9E | 92 | 69 |
| C | 16 | 10 | 0B | ED | 4E | 48 | 53 | B5 | 36 | 20 | 29 | DF | EF | F9 | F0 | 06 |
| D | 36 | 39 | 2B | C4 | 68 | 67 | 75 | 9A | 56 | 49 | 49 | B6 | 89 | 96 | 96 | 69 |
| E | 55 | 53 | 48 | AE | 2D | 2B | 30 | D6 | 79 | 6F | 66 | 90 | 80 | 96 | 9F | 69 |
| F | E5 | EA | F8 | 17 | 9B | 94 | 86 | 69 | 89 | 96 | 96 | 69 | 76 | 69 | 69 | 96 |

METHOD AND APPARATUS FOR ENCRYPTION/AUTHENTICATION OF DATA IN ENERGY METERING APPLICATIONS

A portion of the disclosure of this patent document contains material which is subject to copyright protection. The copyright owner has no objection to the fascimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to communications, and more particularly, to message encryption/decryption and authentication.

B. Related Art

Algorithms for protecting access to computing systems and for authenticating receipt of messages have been widely used in the past. Such algorithms often operate to authenticate and decrypt incoming messages and to generate authentication fields and encrypt outgoing messages. Importantly, although the algorithm used to encrypt and/or authenticate a message can be widely known, a secret keying variable should provide sufficient protection so that unwanted access to a system can be prevented.

Encryption algorithms typically turn plain text into cipher text. The algorithm preferably is "reversible" so that cipher text can be returned to plain text. Plain text, as used herein, refers to the data/messages in a form used by other components of a system.

SUMMARY OF THE INVENTION

The present invention, in one embodiment, is an authentication and encryption/decryption algorithm used to encrypt, decipher and authenticate messages. Its inputs are messages, message lengths, a secret keying variable and an initialization vector. The outputs from the algorithm vary with operation. When authenticating and decrypting, the outputs are a flag indicating whether the message was authenticated and the decrypted message. When encrypting and generating an authentication field, the authentication field and the encrypted message are the outputs.

In the encryption and authentication process, the algorithm has three major steps. The first step is generating cipher text. The second step is generating the authentication field. The third step is encrypting or deciphering the appropriate data in the message.

One byte of cipher text is generated for every byte of plain text contained in the message. After all the cipher text is generated, a four byte authentication field is generated using the last four bytes of cipher text. The message is then scanned for data fields which have been encrypted or are to be encrypted and the corresponding byte of cipher text replaces the message bytes.

The encryption is accomplished by sending the cipher text instead of message text. To decipher the message, the algorithm operates in a reverse mode to replace the cipher text with the message text, i.e., the algorithm is a self-reversing process.

BRIEF DESCRIPTION OF THE DRAWINGS

These and other objects of the present invention, together with further features and advantages thereof, will become apparent from the following detailed specification when read together with the accompanying drawings, in which:

FIGS. 3 A-B illustrate non-time broadcast command and time broadcast command formats, respectively;

FIGS. 7 A-B illustrate the lookup index value bit and the output value bit formats, respectively.

DETAILED DESCRIPTION OF THE DRAWINGS

Figure 1:
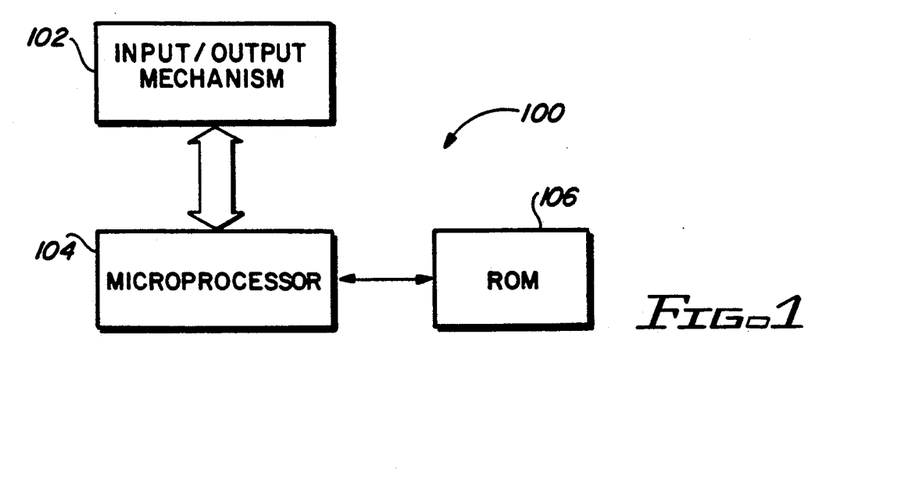
FIG. 1 is a block diagram description of one embodiment of a hardware configuration which may be used to practice the present invention.

FIG. 1 is a block diagram description of one embodiment 100 of a hardware configuration which may be used to practice the present invention. Particularly, an input/output (I/O) mechanism 102 is coupled to a microprocessor 104. The microprocessor 104 is coupled to a memory 106, such as a read-only memory.

The I/O mechanism 102, for example, may be a keyboard and display. The microprocessor 104 preferably is a 16-bit processor having full function, n-around right shift and least-significant bit test capabilities. Of course, other less expensive processors or even an application specific integrated circuit could be designed and used.

Figure 2:
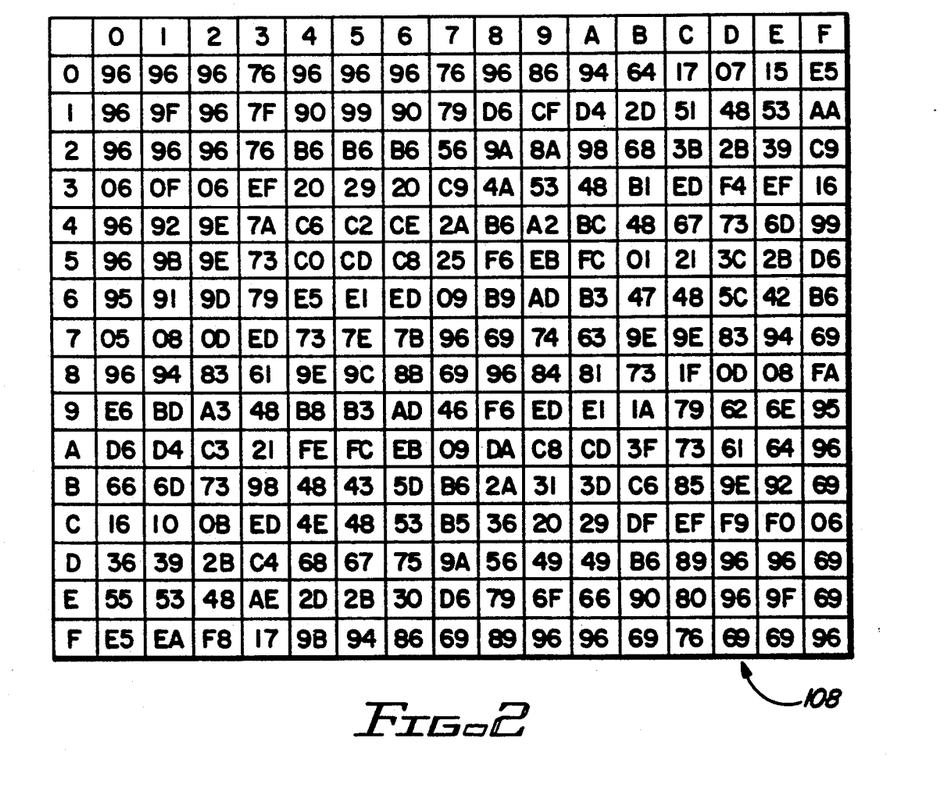
FIG. 2 illustrates a look-up table which, in one alternative embodiment, may be stored in the system memory.

In one embodiment, a lookup table, such as look-up table 108 illustrated in FIG. 2, is stored in the memory 106. The manner of using the look-up table 108 is hereinafter described. Alternatively, if memory (or other) constraints prohibit storage of a table of this size, values could be determined as needed. This value determination is hereinafter described.

The following comprises more details regarding the present algorithm. It should be understood that although the present algorithm is described sometimes herein with reference to electric utility metering applications, the present algorithm has application in many different contexts. It should also be understood that although the encryption/decryption and authentication algorithms are described together herein, such algorithms have separate utility. For example, in some contexts, it may not be necessary to perform encryption/decryption. Rather, the authentication algorithm may only be used. Similarly, in other contexts, only the encryption/decryption algorithm may be used.

Further, in describing the present algorithm in a metering application environment, reference may be made to the Common Application Language (CAL). CAL is a language for a Utility Communications Network and has been proposed as the language to be used as a standard for communicating in the utilities industry. More details regarding CAL are available from the Electronic Industries Association, CEBus Technical Steering Committee, 2001 Pennsylvania Avenue, N.W., Washington, D.C. 20006. It is contemplated, of course, that the present invention has application in a broader context than just in CAL for the utility industry.

In a utility application, one communication path may be from a central computer to a meter located at a remote location such as at a residence. In one embodiment, for example, radio communications may be used for communicating messages/commands between a central computer located at utility headquarters and a bridge unit disposed on the secondary side of a distribution transformer. Communications between the bridge to the meter then may be via power line carrier communications on the power line disposed between the distribution transformer and the residence. One communication system is described in U.S. Pat. No. 3,702,460.

Preventing unwanted access to the communications system is important for system integrity. Encrypting/decrypting and authenticating commands and messages is one manner of providing system security.

With regard to CAL, APDU (Application Layer Protocol Data Unit) messages reside in the information fields of a Medium Access Control (MAC) network layer packet. The APDU header, in the utility context, includes a seven byte field containing data authentication information in the following format:

| BYTE | CONTENTS |
|------|----------|
| 1 | Key ID, indicates key used for authentication |
| 2 | 1st byte of initialization vector - sequence number (LSB) for time broadcast messages or minutes for other messages |
| 3 | 2nd byte of initialization vector - sequence number (MSB) for time broadcast messages or seconds for other messages |
| 4 | 1st byte of authentication vector (LSB) |
| 5 | 2nd byte of authentication vector |
| 6 | 3rd byte of authentication vector |
| 7 | 4th byte of authentication vector (MSB) |

As set forth above, authentication bytes, partial initialization vector, and key ID reside in the APDU header preceding the APDU message. The authentication algorithm is run on only the APDU message within the information field of the MAC packets.

Not all APDU messages require authentication. Authentication only occurs when the APDU header contains authentication data. One field in the APDU header indicates whether the APDU message is authenticated and another field indicates whether the APDU message is encrypted. In the case where the APDU messages contain many bytes, the message may be segmented into multiple packets. The APDU header is contained only in the first packet of a segmented message.

The encryption and authentication algorithm operates two different ways. The first operation authenticates and decrypts incoming messages. The second operation generates authentication fields and encrypts outgoing messages.

The outputs from the algorithm vary with operation. When authenticating and decrypting, the outputs are a flag indicating whether the message was authenticated and the decrypted message. When encrypting and generating an authentication field, the authentication field and the encrypted message are outputs. Much of the data required for authentication is contained in the APDU header. The APDU header contains two bytes to be used in generating the initialization vector, a four byte authentication field which is used to authenticate all previous commands in the APDU message, and a Key ID which identifies which security key should be utilized.

The encryption and authentication algorithm starts with a four byte initialization vector. The initialization vector is based on the time and date the message was sent for all types of commands except for the time broadcast command. Using the time and date message is a very convenient manner for generating the initialization vector. In time broadcast commands the initialization vector is based on a four byte sequence number. The APDU header always contains two bytes which are used for generating the initialization vector.

In non-time broadcast commands, the APDU header contains two bytes which represent the minutes and seconds of the time the message was sent. The receiving device should compare its minutes and seconds to determine the hour, month, day, and year. The sending device's time is assumed to be within a window of tolerance, e.g., within one hour, of the receiving device's time.

In order to prevent unauthorized copying of authenticated messages, e.g., an unauthorized copying of broadcast commands may occur and then the unauthorized copy may be sent at a later time, receiving devices must not only check validity of the authentication field, but also must check whether the initialization vector value (time) is greater than any previously received message. If the initialization vector value (time) is greater than a previously sent message, then the message associated with that vector is passed on through the system.

An algorithm to determine the hour, day, month, and year is described by the following pseudo code:

```
IF (CURRENT MINUTE - SENT MINUTE) > 30
  IF CURRENT MINUTE < SENT MINUTE
    IF CURRENT HOUR = 0
      IF CURRENT DAY = 1
        IF CURRENT MONTH IS JANUARY
          SENT HOUR = 23
          SENT DAY = LAST DAY OF DECEMBER
          SENT MONTH = DECEMBER
          SENT YEAR = CURRENT YEAR - 1
        ELSE
          SENT HOUR = 23
          SENT DAY = CURRENT DAY - 1
          SENT MONTH = CURRENT MONTH
          SENT YEAR = CURRENT YEAR
      ELSE
        SENT HOUR = 23
        SENT DAY = CURRENT DAY - 1
        SENT MONTH = CURRENT MONTH
        SENT YEAR - CURRENT YEAR
    ELSE
      SENT HOUR = CURRENT HOUR - 1
      SENT MONTH = CURRENT MONTH
      SENT DAY = CURRENT DAY
      SENT YEAR = CURRENT YEAR
  ELSE
    IF CURRENT HOUR = 23
      IF CURRENT DAY = LAST DAY OF CURRENT MONTH
        IF CURRENT MONTH IS DECEMBER
          SENT HOUR = 0
          SENT DAY = 1
          SENT MONTH = JANUARY
          SENT YEAR = CURRENT YEAR + 1
        ELSE
          SENT HOUR = 0
          SENT DAY = 1
          SENT MONTH = CURRENT MONTH + 1
          SENT YEAR = CURRENT YEAR
      ELSE
        SENT HOUR = 0
        SENT DAY = CURRENT DAY + 1
        SENT MONTH = CURRENT MONTH
        SENT YEAR = CURRENT YEAR
    ELSE
      SENT HOUR = CURRENT HOUR + 1
      SENT MONTH = CURRENT MONTH
      SENT DAY = CURRENT DAY
      SENT YEAR = CURRENT YEAR
```

-continued
```
ELSE
    SENT HOUR = CURRENT HOUR
    SENT MONTH = CURRENT MONTH
    SENT DAY = CURRENT DAY
    SENT YEAR = CURRENT YEAR
```

Figure 3A:
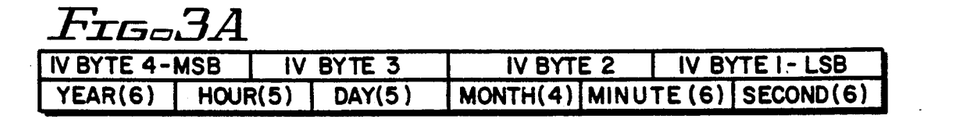

Again, the four byte initialization vector (IV) in non-time broadcast commands is formed using the time and date the message was sent. The format of the four byte initialization vector is described in the diagram shown in FIG. 3A. The year MODULUS 64 is used in order to fit in six bits. The hour is military hour.

Figure 3B:
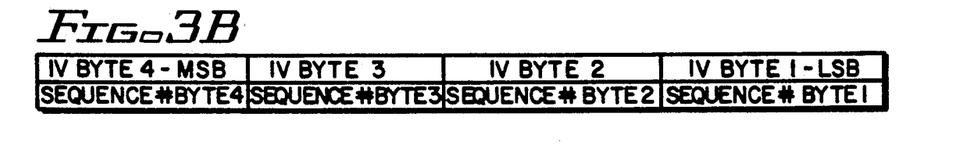

In time broadcast commands, the initialization vector consists of a four byte sequence number. The two least significant bytes of the sequence number are sent as two bytes of the authentication field of the APDU header. The two most significant bytes are contained in the data field of the metering time broadcast command. These bytes are sent least significant byte first as shown in FIG. 3B.

In order to prevent unauthorized copying of authenticated time messages, e.g., an unauthorized copying of broadcast commands may occur and then the unauthorized copy may be sent at a later time, receiving devices must not only check validity of the authentication field, but also must check whether the initialization vector value (sequence number) is greater than any previously received message. In order to pass the message through the system for further processing, the four byte sequence number must be greater than [mod ($2^{32}$)] any previously validated time message, if any. If no previous message exists, then the next authenticated message is received and validated regardless of the sequence.

The encryption and authentication algorithm is used to encrypt, decrypt, and authenticate messages. Its inputs are the message, message length, a secret keying variable, and an initialization vector. The message is examined and if an authentication is indicated by the APDU header of the message, then an initialization vector is generated.

The algorithm has three major steps. The first step is generating cipher text. One byte of cipher text is generated for every byte contained in the message. The second step is to generate the authentication field. The four byte authentication field is generated using four checksum bytes derived from the cipher text. The third step, only required for encrypted messages, is to use the cipher text in place of the plain text.

Note that either the entire message can be encrypted or plain text and cipher text can be mixed in a single message. The message is then scanned for data fields which have been encrypted or are to be encrypted and the corresponding byte of cipher text replaces the plain text.

Figure 4:
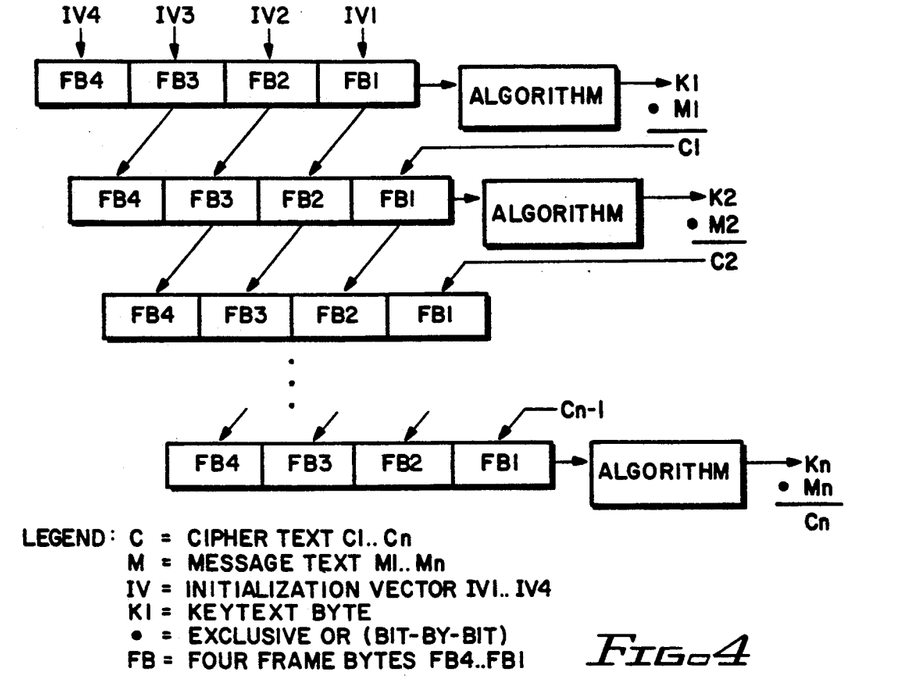
FIG. 4 is a flow chart illustrating an encryption process in accordance with the present invention.

With regard to generating cipher text, and as shown in FIG. 4, the algorithm processes four bytes at a time, starting with the four byte initialization vector. The four bytes being processed form a four byte frame. The frame undergoes a round process (referred to in FIG. 4 as ALGORITHM), described hereinafter in more detail, which results in a single byte referred to herein as the encryption key byte. The encryption key byte is then XOR-ed with the next message byte being processed to form the next byte of cipher text. The frame is then shifted left with the latest byte of cipher text being added on to the end to form the next frame. This process continues until cipher text has been generated for every byte of message text. It is important to maintain the cipher text because the cipher text is used for encryption/decryption of a message and in generating the authentication field.

Figure 5:
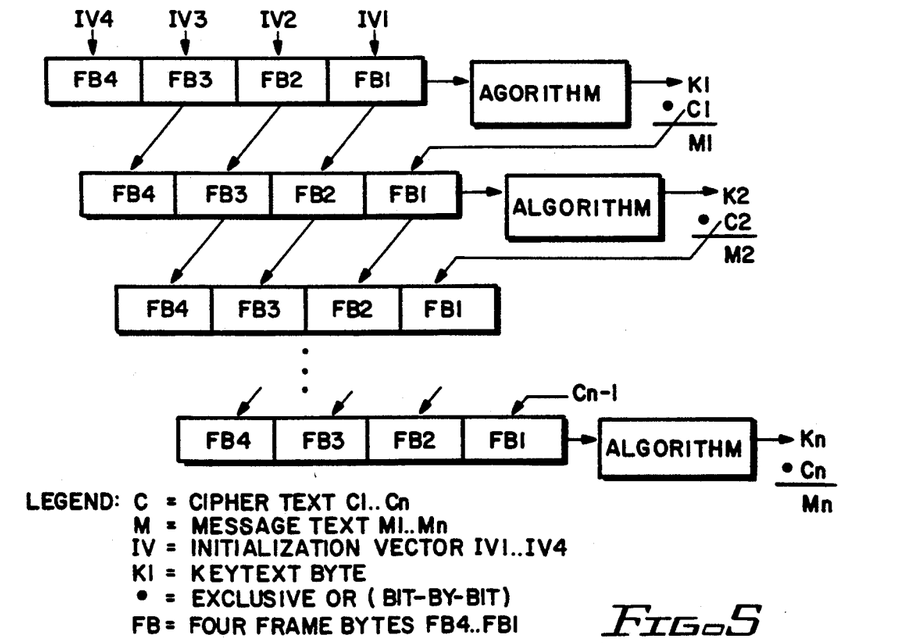
FIG. 5 is a flow chart illustrating a decryption process in accordance with the present invention.

FIG. 5 illustrates the decryption process. The round process also is referred to as ALGORITHM in FIG. 5. Note that when decrypting a message, the frame is constructed differently. When decrypting a message, the frame is shifted left. The next byte of message text is then added to form the next frame.

Encryption and decryption are accomplished by replacing the message text with the corresponding cipher text and vice versa. The message text is scanned for any commands or responses which require the data to be encrypted or decrypted. All commands which contain memory data must be encrypted or decrypted except tables which may or may not be configured to be encrypted. When encrypting or decrypting, only the data following the length field is replaced with the cipher text.

The authentication field is generated using four checksum bytes derived from the initialization vector and the cipher text. The four checksum bytes are initialized to the initialization vector. Every fourth byte of cipher text is then added to the respective checksum until all bytes of cipher text have been added to a checksum. The four checksum bytes are used as the initialization vector for authentication field generation. A single nine round process is performed and the resulting four byte frame forms the four byte authentication. The authentication field generation process is illustrated in Table I shown below. With regard to Table I, "IV" is initialization vector, "C" is cipher text, and "CK" is checksum byte.

TABLE I

|   | IV4 |   | IV3 |   | IV2 |   | IV1 |
|---|-----|---|-----|---|-----|---|-----|
| + | C1  | + | C2  | + | C3  | + | C4  |
| + | C5  | + | C6  | + | ... | + | ... |
|   | CK4 |   | CK3 |   | CK2 |   | CK1 |

Figure 6:
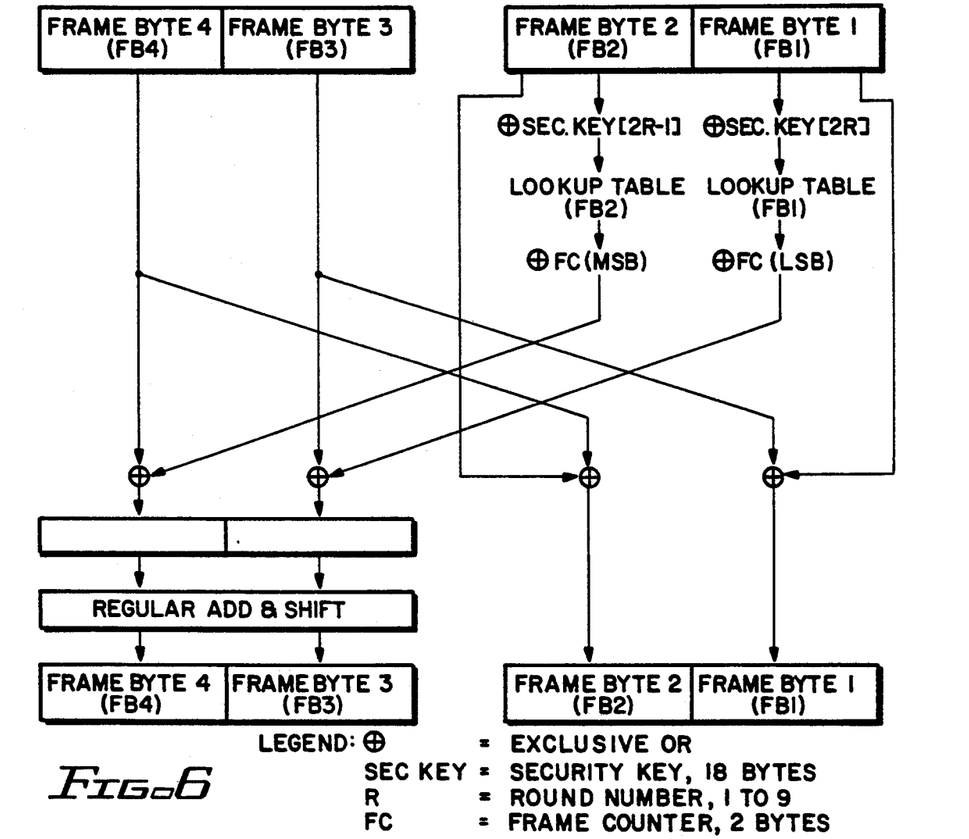
FIG. 6 is a flow chart illustrating a round process in accordance with the present invention.

With regard to the round process, and referring to FIG. 6, the round process operates on a four byte frame, changing it, and producing a keytext byte. The round process comprises nine repetitions of the following process:

1. The process starts by setting the new Frame Byte 1 to Frame Byte 3 EXCLUSIVE-ORed with the original value of Frame Byte 1, and the new Frame Byte 2 to Frame Byte 4 EXCLUSIVE-ORed with the original value of Frame Byte 2.
2. Frame Byte 2 is EXCLUSIVE-ORed with the next byte of the security key, and the security key index is incremented. Frame Byte 1 is EXCLUSIVE-ORed with the next byte of security code, and the security key index is incremented.
3. Frame Byte 2 is then set to the value resulting from a lookup table which uses the value of Frame Byte 2 as its index. Frame Byte 1 is then set to the value resulting from a lookup table which uses the value of Frame Byte 1 as its index.
4. Frame Byte 2 is EXCLUSIVE-ORed with the most significant byte of the frame counter. Frame Byte 1 is then EXCLUSIVE-ORed with the least significant byte of the frame counter.
5. Frame Byte 2 is then EXCLUSIVE-ORed with the original value of Frame Byte 4. Frame Byte 1 is then EXCLUSIVE-ORed with the original value of Frame Byte 3.

6. Using Frame Bytes 2 and 1 as a single 16 bit value, with Frame Byte 2 being the most significant byte, the 16 bit value is shifted right once, with the least significant bit becoming the most significant bit, and the constant, 5EFC Hex, being added. The new Frame Byte 4 is set to the most significant byte of resulting 16 bit value, and the new Frame Byte 3 is set to the least significant byte of resulting 16 bit value. The round is then complete. The round number should be incremented.

After all nine rounds have occurred, keytext byte is set to Frame Byte 3.

By utilizing a regular add and shift operation, there is a one-to-one mapping between the $2^{16}$ possible inputs and the $2^{16}$ possible outputs. This is preferred to just shifting the order of bits from where the bits appear as inputs.

The round number is a one byte counter which indicates which of the nine rounds is being executed. The round number acts as an index into an eighteen byte security key. For each successive round, the next two bytes of the security key are used in the round process, starting with the two least significant bytes. The security keys when sent are sent least significant bytes first.

The frame counter is a two byte number which is incremented with every new frame. The frame counter should be carried from the cipher text generation step through to the authentication field generation step without being re-initialized.

With regard to the security key, the security key is an eighteen byte value. There are multiple security keys in the device. The authentication object contains a Key ID which identifies which security key is to be used to authenticate the APDU message. The security key is used in the encryption and authentication algorithm during the round process as hereinbefore described.

With regard to generation of the security key, the bits may be derived from a source or by a method which is unpredictable, i.e., appears random, in that the probability that any particular bit is a "one" is one-half and the probability that any particular bit is a one is not dependent on the values of any other particular bits. One example of such a system is a random noise generator capacitively coupled, in order to remove any DC offset, to a sampler circuit. Such systems are well-known in the art. The zero-mean random voltage is sampled at a sampling rate slow enough to allow decorrelation between samples. If the sample is negative, a zero is emitted from the sampler circuit. If the sample is zero or positive, a one is emitted from the sampler circuit.

Figure 7A:
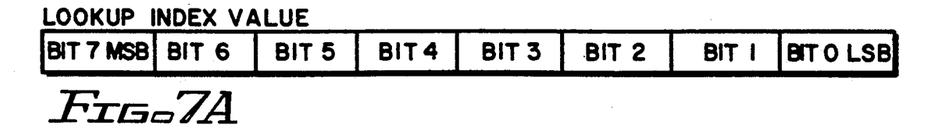
Figure 7B:
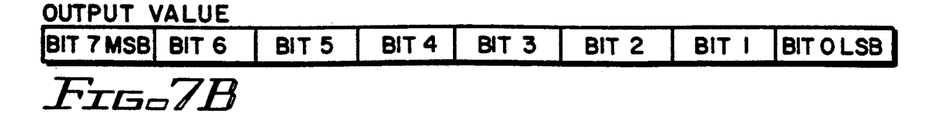

As stated hereinbefore, the encryption and authentication algorithm requires a lookup table which, when given an index byte value, returns a byte value. The lookup table is a 256 byte array as shown in FIG. 2. If memory constraints prohibit the storage of a table of this size, then a value could be calculated instead. The lookup index value bit and the output value bit formats are illustrated in FIGS. 7 A-B. The formulas used for the calculations are provided in Equations 1-8:

$$OB7 = IB7*IB6 + IB5*IB4 + IB3*IB2 + IB1*IB0 + 1 \tag{1}$$

$$OB6 = IB7*IB5 + IB6*IB2 + IB4*IB3 + IB1*IB0 \tag{2}$$

$$OB5 = IB7*IB4 + IB6*IB3 + IB5*IB2 + IB1*IB0 \tag{3}$$

$$OB4 = IB7*IB1 + IB6*IB2 + IB5IB4 + IB3*IB0 + 1 \tag{4}$$

$$OB3 = IB7*IB2 + IB6*IB1 + IB5*IB3 + IB4*IB0 \tag{5}$$

$$OB2 = IB7*IB1 + IB6*IB0 + IB5*IB3 + IB4*IB2 + 1 \tag{6}$$

$$OB1 = IB7*IB0 + IB6*IB5 + IB3*IB1 + IB4*IB2 + 1 \tag{7}$$

$$OB0 = IB7*IB1 + IB6*IB5 + IB3*IB2 + IB4*IB0 \tag{8}$$

Importantly, as explained above, the present invention provides a method for generating a message which includes authentication information. The message and authentication information are sent as one message without requiring that multiple messages be sent. With some known message transmission techniques, "handshaking", i.e., receiving and sending multiple messages before authentication and message operations are complete, operations are required in order to send authentication and message information. This "handshaking" loads the communications system and requires substantial time for execution, especially when communicating with multiple end points. With the present invention, however, by sending the authentication and message information as one message, system loading and the time required for execution are reduced.

An example of a computer program (written in the C computer language) to implement the present invention is provided in Appendix A. A lookup table, rather than separately calculating each byte value, is utilized in the program shown in Appendix A.

While the present invention has been described with respect to specific embodiments, many modifications, variations, substitutions, and equivalents will be apparent to those skilled in the art. Accordingly, the invention is to be considered as limited only by the spirit and scope of the appended claims.

APPENDIX A

```
/***********************************************************

(C) COPYRIGHT 1991 GENERAL ELECTRIC COMPANY

This program is designed to demonstrate the encryption and
 authentication algorithm. It allows the operator to input the message
 and the initailization vector. The program outputs the plain text,
``` the cipher text, and the deciphered text, along with the two authentication fields. The security code is defined as a single fixed eighteen byte value.

```
**********************************************************/ define AND &                        /* Logical AND                              */
define AUTHENTICATION_LENGTH 4      /* Length of Authentication Field           */
#define DECIPHER 0                   /* Decipher the Message                     */
#define ENCRYPT 1                    /* Encrypt the Message                      */
#define FRAME_LENGTH 4               /* Four Byte Frame Length                   */
#define IS &                         /* Logical AND                              */
#define LSB 255                      /* Bit Mask for Least Significant Byte      */
#define MAX_NUMBER_ROUNDS 9          /* Number of Rounds for each key byte       */
#define MOD %                        /* Modulus                                  */
#define MOST_SIG_BIT 0x8000          /* Most Significant Bit                     */
#define MSB 256                      /* Divisor for Most Significant Byte        */
#define ODD 0x01                     /* Bit Mask to determine if odd byte        */
#define RIGHT_SHIFT >>               /* Right Shift Bitwise Operator             */
#define XOR ^                        /* Logical Bitwise Exclusive OR             */

/************************************************************
   regular_add_and_shift This routine is given a least significant byte, and a most
significant byte. The first step is to combine the bytes into a two
byte number. The actual operation is a rotate right, followed by
adding the hexadecimal number 5EFC. Rotating right means the least
significant bit, becomes the most significant bit.
**********************************************************/
void regular_add_and_shift(msb_ptr,lsb_ptr)

unsigned int *msb_ptr, *lsb_ptr;

{ /* BEGIN */ long ras_result;

ras_result = (256 * *msb_ptr) + *lsb_ptr;

if (ras_result IS ODD)
     { ras_result = ras_result RIGHT_SHIFT 1;
       ras_result = ras_result + MOST_SIG_BIT;
       ras_result = ras_result + 0x5EFC;}
   else
     { ras_result = ras_result RIGHT_SHIFT 1;
       ras_result = ras_result + 0x5EFC;}

*msb_ptr = (ras_result RIGHT_SHIFT 8) MOD 256;
   *lsb_ptr = ras_result MOD 256;

} /* END regular_add_and_shift */

/************************************************************
   lookup_table

This routine is passed a value which acts as an index into an array
of numbers. The number found in the array at the specified index is
returned.
**********************************************************/
unsigned int lookup_table_value(table_index)

unsigned int table_index;

{ /* BEGIN */
unsigned int lookup_value;
unsigned int lookup_table[] = {
0x96,0x96,0x96,0x76,0x96,0x96,0x96,0x76,0x96,0x86,0x94,0x64,0x17,0x07,0x15,0xE5
0x96,0x9F,0x96,0x7F,0x90,0x99,0x90,0x79,0xD6,0xCF,0xD4,0x2D,0x51,0x48,0x53,0xAA
0x96,0x96,0x96,0x76,0xB6,0xB6,0xB6,0x56,0x9A,0x8A,0x98,0x68,0x3B,0x2B,0x39,0xC9
0x06,0x0F,0x06,0xEF,0x20,0x29,0x20,0xC9,0x4A,0x53,0x48,0xB1,0xED,0xF4,0xEF,0x16
0x96,0x92,0x9E,0x7A,0xC6,0xC2,0xCE,0x2A,0xB6,0xA2,0xBC,0x48,0x67,0x73,0x6D,0x99
0x96,0x9B,0x9E,0x73,0xC0,0xCD,0xC8,0x25,0xF6,0xEB,0xFC,0x01,0x21,0x3C,0x2B,0xD6
0x95,0x91,0x9D,0x79,0xE5,0xE1,0xED,0x09,0xB9,0xAD,0xB3,0x47,0x48,0x5C,0x42,0xB6
0x05,0x08,0x0D,0xE0,0x73,0x7E,0x7B,0x96,0x69,0x74,0x63,0x9E,0x9E,0x83,0x94,0x69
```

```
0x96,0x94,0x83,0x61,0x9E,0x9C,0x8B,0x69,0x96,0x84,0x81,0x73,0x1F,0x0D,0x08,0xFA
0xB6,0xBD,0xA3,0x48,0xB8,0xB3,0xAD,0x46,0xF6,0xED,0xE1,0x1A,0x79,0x62,0x6E,0x95
0xD6,0xD4,0xC3,0x21,0xFE,0xFC,0xEB,0x09,0xDA,0xC8,0xCD,0x3F,0x73,0x61,0x64,0x96
0x66,0x6D,0x73,0x98,0x48,0x43,0x5D,0xB6,0x2A,0x31,0x3D,0xC6,0x85,0x9E,0x92,0x69
0x16,0x10,0x0B,0xED,0x4E,0x48,0x53,0xB5,0x36,0x20,0x29,0xDF,0xEF,0xF9,0xF0,0x06
0x36,0x39,0x2B,0xC4,0x68,0x67,0x75,0x9A,0x56,0x49,0x49,0xB6,0x89,0x96,0x96,0x69
0x55,0x53,0x48,0xAE,0x2D,0x2B,0x30,0xD6,0x79,0x6F,0x66,0x90,0x80,0x96,0x9F,0x69
0xE5,0xEA,0xF8,0x17,0x9B,0x94,0x86,0x69,0x89,0x96,0x96,0x69,0x76,0x69,0x69,0x96
);

lookup_value = lookup_table[table_index];
    return (lookup_value);

) /* END lookup_table */

/*****************************************************************
    round

This routine does a single round. The round process begins with
    four bytes and a frame counter. For the purpose of this simulation,
    there is a single fixed security key. The round process computes new
    values for all four frame bytes. The new frame byte 2 is set to the
    starting value of frame byte 4 exclusive or-ed with frame byte 2.
    The new frame byte 1 is set to the starting value of frame byte 3
    exclusive or-ed with frame byte 1. The new values for frame bytes 4 and
    3 are computed, by using a series of exclusive or operations, using the
    eighteen bytes of security code, a lookup table function, the
    frame counter, and a regular add and shift function. It should be
    noted, in the C-language, arrays start with an index of 0, therefore
    when indexing into the security key byte array, the index
    calculations have been altered to start with index 0.

*****************************************************************/
void round(FB4,FB3,FB2,FB1,frame_counter,round_number)

unsigned int *FB4;              /* Frame Byte 4                          */
    unsigned int *FB3;              /* Frame Byte 3                          */
    unsigned int *FB2;              /* Frame Byte 2                          */
    unsigned int *FB1;              /* Frame Byte 1                          */
    unsigned int *frame_counter;    /* frame counter is used in round process */
    unsigned int round_number;      /* Round Number from 1 to 9              */

( /* BEGIN */ unsigned int new_FB4;           /* new Frame Byte 4 after round          */
    unsigned int new_FB3;           /* new Frame Byte 3 after round          */
    unsigned int new_FB2;           /* new Frame Byte 2 after round          */
    unsigned int new_FB1;           /* new Frame Byte 1 after round          */
    unsigned int security_key[18]   /* Eighteen Bytes of Security Key        */
        = (1,2,3,4,5,6,7,8,9,10,11,12,13,14,15,16,17,18);

new_FB4 = *FB2 XOR security_key[2 * round_number-2];

new_FB3 = *FB1 XOR security_key[2 * round_number-1];

new_FB4 = lookup_table_value(new_FB4);

new_FB3 = lookup_table_value(new_FB3);

new_FB3 = new_FB3 XOR ((*frame_counter) AND LSB);

new_FB4 = new_FB4 XOR (*frame_counter / MSB);

new_FB4 = new_FB4 XOR *FB4;

new_FB3 = new_FB3 XOR *FB3;

regular_add_and_shift(&new_FB4,&new_FB3);

*FB1 = *FB1 XOR *FB3;

*FB2 = *FB2 XOR *FB4;

*FB3 = new_FB3;

*FB4 = new_FB4;
```

```
/* END round */

/****************************************************************
   round_process This routine repeats the round process for the number of rounds
   set. It should be noted that this routine does not change the
   value of the frame bytes, it returns a single byte.
****************************************************************/
unsigned int round_process(FB4,FB3,FB2,FB1,frame_counter)

unsigned int FB4;              /* Frame Byte 4                      */
unsigned int FB3;              /* Frame Byte 3                      */
unsigned int FB2;              /* Frame Byte 2                      */
unsigned int FB1;              /* Frame Byte 1                      */
unsigned int *frame_counter;   /* frame counter is used in round process */

{ /* BEGIN */
unsigned int FB4_;             /* Frame Byte 4 - working copy       */
unsigned int FB3_;             /* Frame Byte 3 - working copy       */
unsigned int FB2_;             /* Frame Byte 2 - working copy       */
unsigned int FB1_;             /* Frame Byte 1 - working copy       */ unsigned int round_number;     /* Round Number from 1 to 9          */

FB4_ = FB4;
   FB3_ = FB3;
   FB2_ = FB2;
   FB1_ = FB1;

for (round_number = 1; round_number <= MAX_NUMBER_ROUNDS; round_number++)
   {
      round(&FB4_,&FB3_,&FB2_,&FB1_,frame_counter,round_number);
   } return FB3_;

} /* END round_process */

/****************************************************************
   process_message This routine accepts a message, message length, initialization
   vector, a frame counter, and a process for inputs. It generates plain
   and cipher text. The round process is applied to every byte of the
   message to form the cipher text. The frame counter is returned for
   later use in the authentication generation. A process variable which
   identifies whether the message is being ENCRYPTed or DECIPHERed is
   passed. Note that the cipher text should always be used when
   updating the frame. When encrypting the cipher text is generated as
   you go. When decrypting the message text passed in is actually the
   cipher text.
****************************************************************/
void process_message(message,message_length,iv,frame_counter,process,
                     plain_text,cipher_text)

unsigned int *message;         /* message to be encrypted & authenticated */
   unsigned int message_length;   /* number of bytes in message              */
   unsigned int *iv;              /* initialization vector                   */
   unsigned int *frame_counter;   /* frame counter                           */
   unsigned int *plain_text;      /* un-deciphered message                   */
   unsigned int *cipher_text;     /* deciphered message                      */
   unsigned int process;          /* indicates whether ENCRYPT or DECIPHER   */

{ /* BEGIN */ unsigned int frame_4;          /* Frame Byte 4                         */
unsigned int frame_3;          /* Frame Byte 3                         */
unsigned int frame_2;          /* Frame Byte 2                         */
unsigned int frame_1;          /* Frame Byte 1                         */
unsigned int encryption_key;   /* Byte X-ORed to encrypt or decipher   */
unsigned int message_index;    /* index into message byte array        */ frame_4 = iv[3];
   frame_3 = iv[2];
   frame_2 = iv[1];
   frame_1 = iv[0];
```

```
  for (message_index = 0; message_index < message_length; message_index++)
  {
    encryption_key = round_process(frame_4,frame_3,frame_2,frame_1,
                                   frame_counter);

plain_text[message_index] = message[message_index];
    cipher_text[message_index] = message[message_index] XOR encryption_key;

frame_4 = frame_3;
    frame_3 = frame_2;
    frame_2 = frame_1;

if (process == ENCRYPT)
      { frame_1 = cipher_text[message_index]; }
    else
      { frame_1 = message[message_index]; }

(*frame_counter)++;
  }
} /* END process_message */

/****************************************************************
   generate_authentication This routine generates a four byte authentication field for the
processed message. The authentication is generated using four
checksum bytes derived from the cipher text. The checksum bytes are
initialized to the original initialization vector. Every fourth byte
of cipher text is added to each of the four checksum bytes, until every
byte of cipher text has been added to a checksum byte. The resulting
four checksum bytes act as the four frame bytes for a round. A round
is performed and the resulting four frame bytes form the four byte
authentication. This routine assumes every message is
at least four bytes long. In the C-language arrays start with index
0, which is why some index calculations may have changed. The frame
counter is carried over from the message processing, it is not
initialized.
****************************************************************/
void generate_authentication(cipher_text,init_vector,message_length,
                             frame_counter,authentication)

unsigned int *cipher_text;      /* used to generate the initialization vector
unsigned int *init_vector;      /* original initialization vector
unsigned int message_length;    /* total number of bytes in the message
unsigned int *frame_counter;    /* frame counter carried over from message
unsigned int *authentication;   /* four byte authentication field

{ /* BEGIN */ unsigned int checksum[FRAME_LENGTH];   /* checksum bytes for authentication */
unsigned int chk_idx;                  /* checksum index                    */
unsigned int cphr_idx;                 /* cipher text index                 */
unsigned int round_number;             /* Round Number for round process    */

/* Generate the initialization vector for authentication */ for (chk_idx = 0; chk_idx < FRAME_LENGTH; chk_idx++)
    { checksum[chk_idx] = init_vector[chk_idx]; }
  chk_idx = FRAME_LENGTH - 1;

for (cphr_idx = 0; cphr_idx < message_length; cphr_idx++)
  {
    checksum[chk_idx] = checksum[chk_idx] + cipher_text[cphr_idx];
    if (chk_idx > 0)
      { chk_idx--; }
    else
      { chk_idx = FRAME_LENGTH - 1; }
  } for (chk_idx = 0; chk_idx < FRAME_LENGTH; chk_idx++)
    { authentication[chk_idx] = (checksum[chk_idx] % 256); }

/* A single round process produces four new frame bytes, which form
     the four byte authentication. */ round_number = 1;
```

```c
      round(&authentication[3], &authentication[2],
            &authentication[1], &authentication[0],
            *frame_counter,round_number);

} /* END generate_authentication */ void main()

{
unsigned int authentication_1[FRAME_LENGTH]; /* authentication field 1  */
unsigned int authentication_2[FRAME_LENGTH]; /* authentication field 2  */
unsigned int cipher_text[256];      /* encrypted message               */
unsigned int decipher_text[256];    /* deciphered message              */
unsigned int frame_counter;         /* frame counter for round process */
int          i;                     /* index into message              */
char         in_message[256];       /* in-coming message of characters */
unsigned int iv[FRAME_LENGTH];      /* intialization vector            */
unsigned int message[256];          /* message in unsigned bytes       */
unsigned int message_length;        /* number bytes in message         */
unsigned int plain_text[256];       /* message as returned from round  */
unsigned int process;               /* ENCRYPT or DECIPHER             */

/* Enter the message as characters, and convert to unsigned integers */ printf("\n");
   printf("enter message ");
   gets(in_message);
   message_length = strlen(in_message);

for (i = 0; i < message_length; i++)
     { message[i] = (unsigned int)in_message[i]; }

/* Enter the four bytes of the Initialization Vector */ printf("enter four byte initialization vector ");
   scanf("%d %d %d %d",&iv[3],&iv[2],&iv[1],&iv[0]);

/* Encrypt the entire message and generate the authentication */ frame_counter = 1;

process = ENCRYPT;

process_message(message,message_length,iv,&frame_counter,process,
                   plain_text,cipher_text);

generate_authentication(cipher_text,iv,message_length,&frame_counter,
                   authentication_1);

/* Decipher the entire message and generate the authentication */ frame_counter = 1;

process = DECIPHER;

process_message(cipher_text,message_length,iv,&frame_counter,process,
                   plain_text,decipher_text);

generate_authentication(cipher_text,iv,message_length,&frame_counter,
                   authentication_2);

/* Print the results */ printf("\n");
   for (i = 0; i < message_length; i++)
     {
       printf(" plain = %c %02X  cipher = %c %02X decipher = %c %02X\n",
              (char)message[i],message[i],(char)cipher_text[i],cipher_text[i],
              (char)decipher_text[i],decipher_text[i]);
     } printf("\n");
   for (i = (FRAME_LENGTH-1); i >= 0; i--)
```

```
{
    printf(" authentication sent = %c %02X received = %c %02X \n",
        (char)authentication_1[i],authentication_1[i],
        (char)authentication_2[i],authentication_2[i]);
}
}
```

What is claimed is:

1. A method comprising the steps of:
generating cipher text from message text utilizing an add and shift operation, the step of generating cipher text comprising the steps of:
 (a) generating an initialization vector;
 (b) forming a frame from the initialization vector;
 (c) providing the frame as input for a round process;
 (d) generating a key byte from the round process;
 (e) generating cipher text from the key byte; and
 (f) if cipher text has not been generated for each byte of message text, forming a next frame for processing utilizing the cipher text generated in step (e) and returning to step (e); and
replacing the message text with cipher text.

2. A method in accordance with claim 1 further comprising the step of generating an authentication field using checksum bytes derived from the cipher text.

3. A method in accordance with claim 1 wherein one byte of cipher text is generated for each byte of message text.

4. A method in accordance with claim 1 wherein cipher text is communicated between components of a utility communications network.

5. A method in accordance with claim 1 wherein the round process comprises the steps of:
 (a) setting a new Frame Byte 1 to Frame Byte 3 EXCLUSIVE-ORed with the original value of Frame Byte 1, and setting the new Frame Byte 2 to Frame Byte 4 EXCLUSIVE-ORed with the original value of Frame Byte 2;
 (b) EXCLUSIVE-ORing Frame Byte 2 with the next byte of the security key, incrementing a security key index, EXCLUSIVE-ORing Frame Byte 1 with the next byte of security code, and incrementing the security key index;
 (c) setting Frame Byte 2 to a value determined using the value of Frame Byte 2 as an index, and setting Frame Byte 1 to the value resulting from using the value of Frame Byte 1 as an index;
 (d) EXCLUSIVE-ORing Frame Byte 2 with the most significant byte of the frame counter, and EXCLUSIVE-ORing Frame Byte 1 with the least significant byte of the frame counter;
 (e) EXCLUSIVE-ORing Frame Byte 2 with the original value of Frame Byte 4 and EXCLUSIVE-ORing Frame Byte 1 with the original value of Frame Byte 3: and
 (f) using Frame Bytes 2 and 1 as a single 16 bit value, with Frame Byte 2 being the most significant byte, the 16 bit value being shifted right once, with the least significant bit becoming the most significant bit, and the constant, 5EFC Hex, being added thereto, the new Frame Byte 4 being set to the most significant byte of resulting 16 bit value, and the new Frame Byte 3 being set to the least significant byte of the resulting 16 bit value, and incrementing the round number.

6. A method in accordance with claim 1 wherein the initialization vector is based on the message time and date.

7. A method in accordance with claim 1 wherein the initialization vector is based on a four byte sequence.

8. A method comprising the steps of:
generating an authentication field for message bytes using checksum bytes derived from cipher text of the message bytes, generating cipher text comprising the steps of:
 (a) generating an initialization vector;
 (b) forming a frame from the initialization vector;
 (c) providing the frame as input for a round process;
 (d) generating a key byte from the round process;
 (e) generating cipher text from the key byte; and
 (f) if cipher text has not been generated for each byte of message text, forming a next frame for processing utilizing the cipher text generated in step (e) and returning to step (e); and
transmitting the authentication field with the message bytes.

9. A method in accordance with claim 8 wherein the cipher text is generated from the message text utilizing an add and shift operation.

10. A method in accordance with claim 8, wherein the round process comprises the steps of:
 (a) setting a new Frame Byte 1 to Frame Byte 3 EXCLUSIVE-ORed with the original value of Frame Byte 1, and setting the new Frame Byte 2 to Frame Byte 4 EXCLUSIVE-ORed with the original value of Frame Byte 2;
 (b) EXCLUSIVE-ORing Frame Byte 2 with the next byte of the security key, incrementing a security key index, EXCLUSIVE-ORing Frame Byte 1 with the next byte of security code, and incrementing the security key index;
 (c) setting Frame Byte 2 to a value determined using the value of Frame Byte 2 as an index, and setting Frame Byte 1 to the value resulting from using the value of Frame Byte 1 as an index;
 (d) EXCLUSIVE-ORing Frame Byte 2 with the most significant byte of the frame counter, and EXCLUSIVE-ORing Frame Byte 1 with the least significant byte of the frame counter;
 (e) EXCLUSIVE-ORing Frame Byte 2 with the original value of Frame Byte 4 and EXCLUSIVE-ORing Frame Byte 1 with the original value of Frame Byte 3; and
 (f) using Frame Bytes 2 and 1 as a single 16 bit value, with Frame Byte 2 being the most significant byte, the 16 bit value being shifted right once, with the least significant bit becoming the most significant bit, and the constant, 5EFC Hex, being added thereto, the new Frame Byte 4 being set to the most significant byte of resulting 16 bit value, and the new Frame Byte 3 being set to the least significant byte of the resulting 16 bit value, and incrementing the round number.

11. Apparatus, comprising:
computing means;
means for inputting information to said computing means;

memory means coupled to said computing means; and wherein said computing means is controlled to perform the steps of:

generating an authentication field for message bytes using checksum bytes derived from cipher text of the message bytes, generating cipher text from message text comprising the steps of:

(a) generating an initialization vector;

(b) forming a frame from the initialization vector;

(c) providing the frame as input for the round process;

(d) generating a key byte from the round process;

(e) generating cipher text from the key byte;

(f) if cipher text has not been generated for each byte of message text, forming a next frame for processing utilizing the cipher text generated in step (e) and returning to step (e); and transmitting the authentication field with the message bytes.

12. Apparatus in accordance with claim 11 wherein said computing means generates the cipher text from the message text utilizing an add and shift operation.

13. Apparatus in accordance with claim 11 wherein said computing means, for the round process, is programmed to perform the steps of:

(a) setting a new Frame Byte 1, and setting the new Frame Byte 2 to Frame Byte 4 EXCLUSIVE-ORed with the original value of Frame Byte 2;

(b) EXCLUSIVE-ORing Frame Byte 2 with the next byte of the security key, incrementing a security key index, EXCLUSIVE-ORing Frame Byte 1 with the next byte of security code, and incrementing the security key index;

(c) setting Frame Byte 2 to a value determined using the value of Frame Byte 2 as an index, and setting Frame Byte 1 to the value resulting from using the value of Frame Byte 1 as an index;

(d) EXCLUSIVE-ORing Frame Byte 2 with the most significant byte of the frame counter, and EXCLUSIVE-ORing Frame Byte 1 with the least significant byte of the frame counter;

(e) EXCLUSIVE-ORing Frame Byte 2 with the original value of Frame Byte 4 and EXCLUSIVE-ORing Frame Byte 1 with the original value of Frame Byte 3; and (f) using Frame Bytes 2 and 1 as a single 16 bit value, with Frame Byte 2 being the most significant byte, the 16 bit value being shifted right once, with the least significant bit becoming the most significant bit, and the constant, 5EFC Hex, being added thereto, the new Frame Byte 4 being set to the most significant byte of resulting 16 bit value, and the new Frame Byte 3 being set to the least significant byte of the resulting 16 bit value, and incrementing the round number.

14. A method comprising the steps of:

generating an authentication field for message bytes using checksum bytes derived from cipher text of the message bytes, generating cipher text comprising the steps of:

(a) generating an initialization vector;

(b) forming a frame from the initialization vector;

(c) providing the frame as input for a round process;

(d) generating a key byte from the round process;

(e) generating cipher text from the key byte; and (f) if cipher text has not been generated for each byte of message text, forming a next frame for processing utilizing the cipher text generated in step (e) and returning to step (e);

transmitting the authentication field and the message information as one message from a central location to a remote location.

15. A method in accordance with claim 14 further comprising the steps of:

generating cipher text from message text utilizing an add and shift operation;

replacing at least one bit of the message text with one bit of cipher text; and transmitting the cipher text and the authentication field.

16. A method in accordance with claim 15 wherein the authentication field is generated using checksum bytes derived from the cipher text.

17. A method in accordance with claim 15 wherein one byte of cipher text is generated for each byte of message text.

18. A method in accordance with claim 15 wherein the message includes plain text and cipher text.

19. A method in accordance with claim 15 wherein each bit of plain text is replaced with cipher text.

20. Energy meter means, comprising:

metering means for measuring energy consumed by an end-user and supplied from a power delivery system;

computing means;

means for transmitting information to a device external said energy meter means, said transmitting means being coupled to said computing means;

memory means coupled to said computing means; and wherein said computing means is controlled to perform the steps of:

generating an authentication field for message bytes using checksum bytes derived from cipher text of the message bytes, generating cipher text from message text comprising the steps of:

(a) generating an initialization vector;

(b) forming a frame from the initialization vector;

(c) providing the frame as input for a round process;

(d) generating a key byte from the round process;

(e) generating cipher text from the key byte;

(f) if cipher text has not been generated for each byte of message text, forming a next frame for processing utilizing the cipher text generated in step (e) and returning to step (e); and providing, to said transmitting means, the authentication field with the message bytes.

21. Energy meter means in accordance with claim 20 wherein said computing means generates the cipher text from the message text utilizing an add and shift operation.

22. Energy meter means in accordance with claim 20 wherein said computing means, for the round process, is programmed to perform the step of:

(a) setting a new Frame Byte 1 to Frame Byte 3 EXCLUSIVE-ORed with the original value of Frame Byte 1, and setting the new Frame Byte 2 to Frame Byte 4 EXCLUSIVE-ORed with the original value of Frame Byte 2;
(b) EXCLUSIVE-ORing Frame Byte 2 with the next byte of the security key, incrementing a security key index, EXCLUSIVE-ORing Frame Byte 1 with the next byte of security code, and incrementing the security key index;
(c) setting Frame Byte 2 to a value determined using the value of Frame Byte 2 as an index, and setting Frame Byte 1 to the value resulting from using the value of Frame Byte 1 as an index;
(d) EXCLUSIVE-ORing Frame Byte 2 with the most significant byte of the frame counter, and EXCLUSIVE-ORing Frame Byte 1 with the least significant byte of the frame counter;
(e) EXCLUSIVE-ORing Frame Byte 2 with the original value of Frame Byte 4 and EXCLUSIVE-ORing Frame Byte 1 with the original value of Frame Byte 3; and
(f) using Frame Bytes 2 and 1 as a single 16 bit value, with Frame Byte 2 being the most significant byte, the 16 bit value being shifted right once, with the least significant bit becoming the most significant bit, and the constant, 5EFC Hex, being added thereto, the new Frame Byte 4 being set to the most significant byte of resulting 16 bit value, and the new Frame Byte 3 being set to the least significant byte of the resulting 16 bit value, and incrementing the round number.

23. Energy meter means in accordance with claim 20 wherein said transmitting means is coupled to a power line of the power delivery system and wherein information is transmitted on the power line from said meter means to the external device.

24. Energy meter means in accordance with claim 20 wherein said transmitting means comprises a radio transmitter.

25. A system, comprising:
central communication means comprising first computing means and first transmitting/receiving means;
metering means for measuring energy consumed by an end-user and supplied from a power delivery system, said metering means comprising second computing means and second transmitting/receiving means;
said first computing means and said second computing means being controlled to perform the steps of:
generating an authentication field for message bytes using checksum bytes derived from cipher text of the message bytes, generating cipher text from message text comprising the steps of:
(a) generating an initialization vector;
(b) forming a frame from the initialization vector;
(c) providing the frame as input for a round process;
(d) generating a key byte from the round process;
(e) generating cipher text from the key byte;
(f) if cipher text has not been generated for each byte of message text, forming a next frame for processing utilizing the cipher text generated in step (e) and returning to step (e).

26. A system in accordance with claim 25 wherein said first and second computing means generate the cipher text from the message text utilizing an add and shift operation.

27. A system in accordance with claim 25 wherein said computing means, for the round process, is programmed to perform the steps of:
(a) setting a new Frame Byte 1 to Frame Byte 3 EXCLUSIVE-ORed with the original value of Frame Byte 1, and setting the new Frame Byte 2 to Frame Byte 4 EXCLUSIVE-ORed with the original value of Frame Bye 2;
(b) EXCLUSIVE-ORing Frame Byte 2 with the next byte of the security key, incrementing a security key index, EXCLUSIVE-ORing Frame Byte 1 with the next byte of security code, and incrementing the security key index;
(c) setting Frame Byte 2 to a value determined using the value of Frame Byte 2 as an index, and setting Frame Byte 1 to the value resulting from using the value of Frame Byte 1 as an index;
(d) EXCLUSIVE-ORing Frame Byte 2 with the most significant byte of the frame counter, and EXCLUSIVE-ORing Frame Byte 1 with the least significant byte of the frame counter;
(e) EXCLUSIVE-ORing Frame Byte 2 with the original value of Frame Byte 4 and EXCLUSIVE-ORing Frame Byte 1 with the original value of Frame Byte 3; and
(f) using Frame Bytes 2 and 1 as a single 16 bit value, with Frame Byte 2 being the most significant byte, the 16 bit value being shifted right once, with the least significant bit becoming the most significant bit, and the constant, 5EFC Hex, being added thereto, the new Frame Byte 4 being set to the most significant byte of resulting 16 bit value, and the new Frame Byte 3 being set to the least significant byte of the resulting 16 bit value, and incrementing the round number.

28. A system in accordance with claim 25 wherein said first and second receiving/transmitting means comprise first and second radio transceivers.

29. A system in accordance with claim 25 further comprising intermediate control means for transforming radio transmitted information to a form compatible for communications on a power line and for transforming information transmitted on a power line to a form compatible for radio communications, and wherein said first receiving/transmitting means comprising a radio transceiver and said second receiving/transmitting means is coupled to a power line of the power delivery system.

30. Energy meter means, comprising:
metering means for measuring energy consumed by an end-user and supplied from a power delivery system;
computing means;
means for receiving information from a device external said energy meter means, said receiving means being coupled to said computing means;
memory means coupled to said computing means; and
wherein said computing means is controlled to perform the step of generating message text from cipher text by performing the steps of:
(a) generating an initialization vector;
(b) forming a frame from the initialization vector;
(c) providing the frame as input for a round process;
(d) generating a key byte from the round process;
(e) generating message text from the key byte;

(f) if message text has not been generated for each byte of cipher text, forming a next frame for processing utilizing the message text generated in step (e) and returning to step (e).

31. Energy meter means in accordance with claim 30 wherein said computing means, for the round process, is programmed to perform the steps of:

(a) setting a new Frame Byte 1 to Frame Byte 3 EXCLUSIVE-ORed with the original value of Frame Byte 1, and setting the new Frame Byte 2 to Frame Byte 4 EXCLUSIVE-ORed with the original value of Frame Byte 2;

(b) EXCLUSIVE-ORing Frame Byte 2 with the next byte of the security key, incrementing a security key index, EXCLUSIVE-ORing Frame Byte 1 with the next byte of security code, and incrementing the security key index;

(c) setting Frame Byte 2 to a value determined using the value of Frame Byte 2 as an index, and setting Frame Byte 1 to the value resulting from using the value of Frame Byte 1 as an index;

(d) EXCLUSIVE-ORing Frame Byte 2 with the most significant byte of the frame counter, and EXCLUSIVE-ORing Frame Byte 1 with the least significant byte of the frame counter;

(e) EXCLUSIVE-ORing Frame Byte 2 with the original value of Frame Byte 4 and EXCLUSIVE-ORing Frame Byte 1 with the original value of Frame Byte 3; and (f) using Frame Bytes 2 and 1 as a single 16 bit value, with Frame Byte 2 being the most significant byte, the 16 bit value being shifted right once, with the least significant bit becoming the most significant bit, and the constant, 5EFC Hex, being added thereto, the new Frame Byte 4 being set to the most significant byte of resulting 16 bit value, and the new Frame Byte 3 being set to the least significant byte of the resulting 16 bit value, and incrementing the round number.

32. Energy meter means in accordance with claim 30 wherein said receiving means is coupled to a power line of the power delivery system and wherein information is received on the power line from the external device.

33. Energy meter means in accordance with claim 30 wherein said receiving means comprises a radio receiver.

34. Energy meter means in accordance with claim 30 wherein said receiving means is coupled to a telephone line and wherein information is received on the telephone line from the external device.

35. Receiver means, comprising:
computing means;
means for receiving information from a device external said energy meter means, said receiving means being coupled to said computing means;
memory means coupled to said computing means; and
wherein said computing means is controlled to perform the step of generating message text from cipher text by performing the steps of:
(a) generating an initialization vector;
(b) forming a frame from the initialization vector;
(c) providing the frame as input for a round process;
(d) generating a key byte from the round process;
(e) generating message text from the key byte;
(f) if message text has not been generated for each byte of cipher text, forming a next frame for processing utilizing the message text generated in step (e) and returning to step (e).

36. Receiver means in accordance with claim 35 wherein said computing means, for the round process, is programmed to perform the steps of:

(a) setting a new Frame Byte 1 to Frame Byte 3 EXCLUSIVE-ORed with the original value of Frame Byte 1, and setting the new Frame Byte 2 to Frame Byte 4 EXCLUSIVE-ORed with the original value of Frame Byte 2;

(b) EXCLUSIVE-ORing Frame Byte 2 with the next byte of the security key, incrementing a security key index, EXCLUSIVE-ORing Frame Byte 1 with the next byte of security code, and incrementing the security key index;

(c) setting Frame Byte 2 to a value determined using the value of Frame Byte 2 as an index, and setting Frame Byte 1 to the value resulting from using the value of Frame Byte 1 as an index;

(d) EXCLUSIVE-ORing Frame Byte 2 with the most significant byte of the frame counter, and EXCLUSIVE-ORing Frame Byte 1 with the least significant byte of the frame counter;

(e) EXCLUSIVE-ORing Frame Byte 2 with the original value of Frame Byte 4 and EXCLUSIVE-ORing Frame Byte 1 with the original value of Frame Byte 3; and (f) using Frame Bytes 2 and 1 as a single 16 bit value, with Frame Byte 2 being the most significant byte, the 16 bit value being shifted right once, with the least significant bit becoming the most significant bit, and the constant, 5EFC Hex, being added thereto, the new Frame Byte 4 being set to the most significant byte of resulting 16 bit value, and the new Frame Byte 3 being set to the least significant byte of the resulting 16 bit value, and incrementing the round number.

37. Receiver means in accordance with claim 35 wherein said receiving means is coupled to a power line of the power delivery system and wherein information is received on the power line from the external device.

38. Receiver means in accordance with claim 35 wherein said receiving means comprises a radio receiver.

39. Receiver means in accordance with claim 35 wherein said receiving means is coupled to a telephone line and wherein information is received on the telephone line from the external device.

40. Receiver means in accordance with claim 35 wherein said receiving means comprises optical communication means.

* * * * *

UNITED STATES PATENT AND TRADEMARK OFFICE
CERTIFICATE OF CORRECTION

PATENT NO. : 5,239,584  
DATED : August 24, 1993  
INVENTOR(S) : Hershey, et al

Page 1 of 2

It is certified that error appears in the above-indentified patent and that said Letters Patent is hereby corrected as shown below:

On the title page: Item [75]

Inventors: "Ballston," should be --Ballston Lake,--.

Column 8, line 9, after "provided" insert --below--.

Column 8, line 17, "IB5IB4" should be --IB5*IB4--.

Column 19, lines 15-18 should be indented.

Column 21, line 30, after "Byte 1" insert --to Frame Byte 3 EXCLUSIVE_ORed with the original value of Frame Byte 1,--.

Column 22, line 65, "step" should be --steps--.

UNITED STATES PATENT AND TRADEMARK OFFICE
CERTIFICATE OF CORRECTION

PATENT NO. : 5,239,584
DATED : August 24, 1993
INVENTOR(S) : Hershey et al

It is certified that error appears in the above-indentified patent and that said Letters Patent is hereby corrected as shown below:

Column 24, line 46, "comprising" should be --comprises--.

Signed and Sealed this

Twenty-fourth Day of May, 1994

*Attest:*

BRUCE LEHMAN

*Attesting Officer*     *Commissioner of Patents and Trademarks*